United States Patent
Nishikawa

[15] 3,693,747
[45] Sept. 26, 1972

[54] APPARATUS FOR CONTROLLING THE OPERATION OF POWER STEERING APPARATUS IN A VEHICLE

[72] Inventor: Masao Nishikawa, Saitama-ken, Japan

[73] Assignee: Honda Giken Kogyo Kabushiki Kaisha, Tokyo, Japan

[22] Filed: Oct. 13, 1970

[21] Appl. No.: 80,338

[30] Foreign Application Priority Data

Oct. 13, 1969 Japan ...................44/81124

[52] U.S. Cl. ................180/79.2 R, 60/52 S, 137/115
[51] Int. Cl. ..........................................B62d 5/08
[58] Field of Search....180/79.2 R; 60/52 S; 137/115, 137/117

[56] References Cited

UNITED STATES PATENTS

| 2,603,065 | 7/1952 | Sarto | 60/52 S |
| 3,320,968 | 5/1967 | Nuss | 137/117 |
| 2,734,589 | 2/1956 | Groen | 180/79.2 R X |
| 2,748,881 | 6/1956 | Holley | 180/79.2 R |
| 2,773,351 | 12/1956 | Staude | 60/52 S |
| 3,197,960 | 8/1965 | Forster | 60/52 S |
| 3,291,245 | 12/1966 | Hewko | 180/79.2 R |
| 3,415,266 | 12/1968 | Brady | 137/117 |
| 2,996,136 | 8/1961 | Nallinger et al. | 180/79.2 R |

*Primary Examiner*—Kenneth H. Betts
*Assistant Examiner*—Leslie J. Paperner
*Attorney*—Waters, Roditi, Schwartz & Nissen

[57] ABSTRACT

Apparatus is provided for controlling the operation of a power steering unit in a vehicle and comprises a main passage connecting an oil pressure pump selectively with either one of two opposite end chambers in a steering power cylinder by means of a control valve operated by a steering handle. The main passage is provided with a bypass connecting the positive side and the negative side of the pump, and a vehicle speed responsive valve is interposed in the bypass and controls the size of the bypass by being gradually increased in its degree of opening in response to increase in the vehicle speed.

1 Claim, 1 Drawing Figure

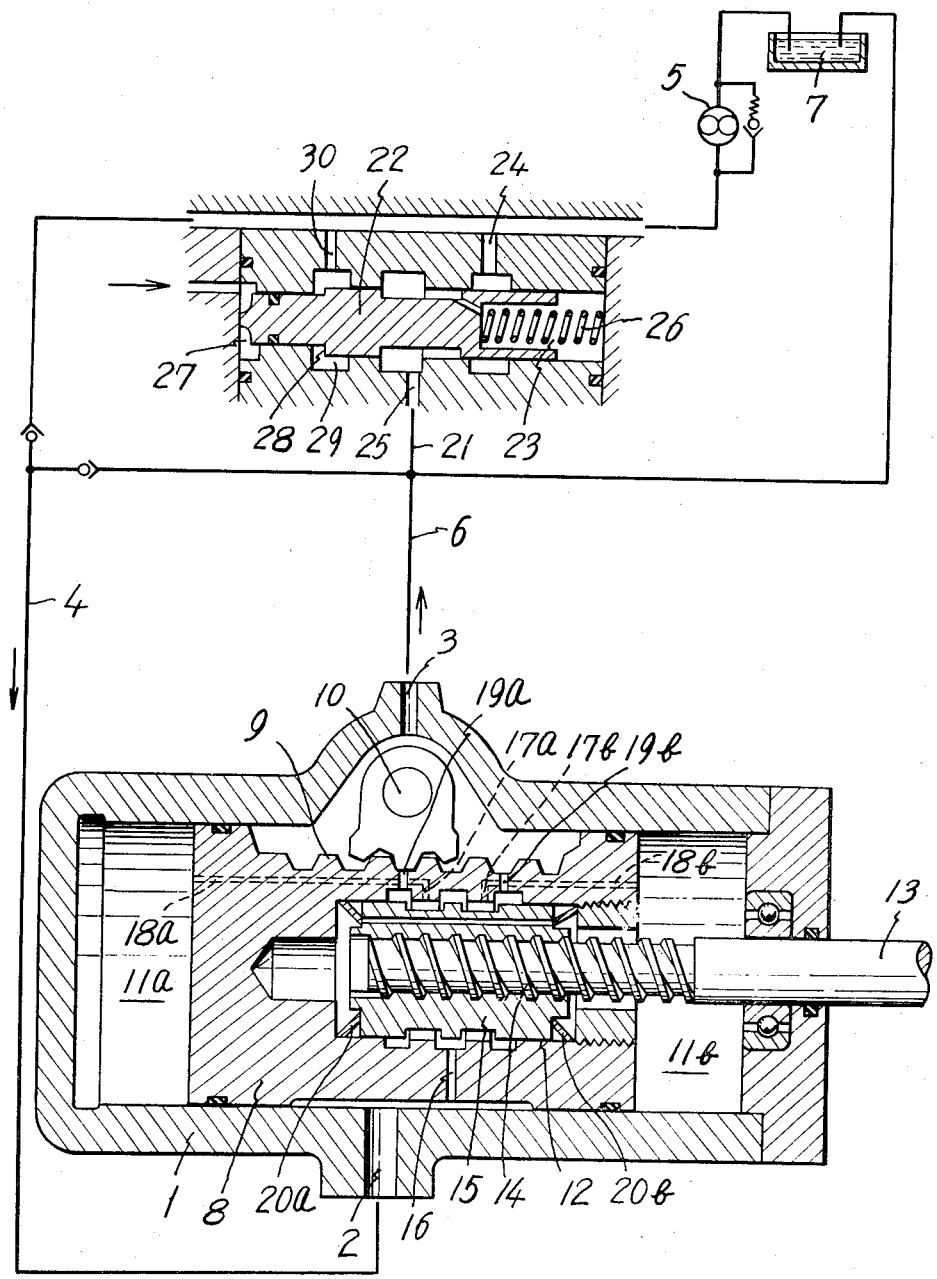
INVENTOR
Masao Nishikawa

3,693,747

APPARATUS FOR CONTROLLING THE OPERATION OF POWER STEERING APPARATUS IN A VEHICLE

BRIEF SUMMARY OF THE INVENTION

This invention relates to control apparatus for power steering units in a vehicle such as a motor car, and more particularly to control apparatus in which steering force is gradually decreased in response to increase in vehicle speed thus preventing oversteering of the vehicle during high speed travel.

According to the invention, a main passage, connecting an oil pressure pump selectively with either one of two opposite end chambers of a steering power cylinder through a control valve operated by a steering handle, is provided with a bypass connecting the positive side and the negative side of the oil pressure pump, a vehicle speed responsive valve being interposed in the bypass and being gradually increased in its degree of opening in response to increase in vehicle speed.

There is thus provided a short circuit path to said pump which bypasses the power cylinder, said vehicle speed responsive valve controlling the opening of the short circuit path and consequent diversion of the flow of the pressure fluid from the power cylinder directly back to the pump with attendant bypass of the power cylinder.

BRIEF DESCRIPTION OF THE DRAWING

The sole FIGURE of the drawing is a sectional side view diagrammatically showing the apparatus according to the invention.

DETAILED DESCRIPTION

Referring to the drawing, numeral 1 denotes a power cylinder of a power steering unit for a vehicle, numeral 2 denotes an inlet opening at one side thereof and numeral 3 denotes an outlet opening at the other side thereof. The inlet opening 2 is in communication through a main passage 4 with the positive side, that is, the discharge side of an oil pressure pump 5, and the outlet opening 3 is in communication through a return passage 6 with a reservoir 7 connected to the negative side, that is, the suction side of the oil pressure pump 5. The cylinder 1 contains a slidable power piston 8, and an operation shaft 10 for steering is connected to the power piston 8 through pinion and rack mechanism 9. Oil chambers 11a and 11b are formed at both sides of the piston 8. The piston 8 has a valve chamber 12 therein, and a slidable control valve 15 engaged with a steering shaft 13 through a thread 14 is contained in the chamber 12. The valve 15 is in communication at one side inlet opening 16 thereof with the inlet opening 2 and at its other right and left side outlet openings 17a and 17b with the right and left oil chambers 11a and 11b through respective passages 18a and 18b. The valve 15 has an additional right and left side discharge openings 19a and 19b in communication with the outlet opening 3. If the valve 15 is moved to the right or the left in the drawing by turning of the shaft 13, there are selectively obtained a first condition in which one of the right and left oil chambers 11a and 11b is in communication with the inlet opening 2 while the other is in communication with the outlet opening 3, and a second condition in which the aforesaid one oil chamber is in communication with the outlet opening 3 and the said other is in communication with the inlet opening 2. Consequently, the power piston 8 is pushed to move to the right or the left by the pressure oil in either one of the oil chambers 11a and 11b and thus the operation shaft 10 is rotated to the left or the right and the vehicle is subjected to a power steering to the right or the left. The valve 15 is disposed to face the inner opposite end surfaces of the valve chamber 12 through respective springs 20a and 20b interposed therebetween, so that when the valve 15 is moved to the right or the left by turning of the shaft 13, the piston 8 is also moved by action of the springs. Accordingly, the piston can be operated not only by the pressure oil as mentioned before, but also manually when the supply of pressure oil is interrupted or its pressure drops. In other words, the operation shaft 10 can also be rotated without power assist.

If the pressure oil supplied to the power cylinder 1 through the main passage 4 is comparatively high in pressure, the power steering force is comparatively great in proportion thereto, and this great force is advantageous when the steering is comparatively hard, as in the case when the vehicle runs at low speed or is stopped. But this force is liable to result in oversteering when the steering becomes comparatively easy as the vehicle speed is gradually increased.

To prevent this deficiency, the invention contemplates that main passage 4 is provided with a bypass 21 communicating between the positive side and the negative side of the pump 5 whereby to form a short circuit path for the pump 5. A vehicle speed responsive valve 22 is interposed in the short circuit path. The valve 22 comprises a spool valve slidably contained in a valve chamber 23 and is interposed at one side inlet opening 24 thereof and at its other side outlet opening 25 in the bypass 21. Additionally, the valve 22 is urged to move towards its closing position by a spring 26 disposed at one end and is urged to move towards its opening position by a governor pressure, i.e., an oil pressure corresponding to vehicle speed, supplied to a pressure receiving chamber 27 at its other end. Additionally, the valve 22 is provided at its middle portion with a shoulder portion 28 and a chamber 29 formed therearound, and the pressure oil in the main passage 4 is supplied thereto through a passage 30, and thereby the valve 22 is urged to move towards its opening position under the action of the pressure of the fluid in passage 4. If the vehicle speed is gradually increased, the governor pressure corresponding thereto acts on the valve 22 to move the same towards the opening position against the action of the spring 26, so that the pressure oil in the main passage 4 is partly diverted through the bypass passage 21 whereby the pressure in the passage 4 is more or less lowered. As a result of this decrease in the pressure, the force acting through the shoulder portion 28 on the valve 22 to move the same in the direction of opening is decreased in proportion thereto, so that the valve 22 is returned towards its closing position by that degree, and thus the valve 22 is increased in its degree of opening gradually with a comparatively gentle curve in response to the increase in the vehicle speed. Accordingly, the bypass 21 is gradually opened and the pressure oil in the main passage 4 is gradually lowered in pressure, and in proportion thereto the power steering force acting on the shaft 10 through the power piston 8 is gradually reduced.

Instead of detecting the vehicle speed as a governor pressure and applying said pressure to the valve 22, a centrifugal force corresponding to the vehicle speed can be applied directly to the end of the valve 22.

According to this invention, as described above, the power steering force is gradually decreased with increase in vehicle speed, to counter balance the reduction in steering effort as the vehicle speed is increased, and consequently eliminate oversteering during high speed operation. Additionally, the decrease in the power steering force is effected only by gradually opening the bypass diverged from the main passage, so that there is not brought about a large variation of load on the pump.

What is claimed is:

1. Power steering apparatus for a vehicle comprising a power cylinder, a displaceable piston in said cylinder defining opposite end chambers therein, said piston being coupled to and controlling the operation of an operation shaft, a pump for pressure fluid, a main passage connecting the pump to the cylinder, control valve means in said cylinder for selectively connecting the main passage with the chambers in accordance with a steering operation, a bypass passage extending from the main passage back to the pump for the bypass of pressure fluid to said cylinder, bypass valve means in said bypass passage for controlling the degree of opening of the bypass passage in response to vehicle speed, said bypass valve means comprising a displaceable spool valve controlling communication between the bypass passage and two side openings in the valve means connected to the main passage, spring means acting on said spool valve to urge the same in a direction closing communication between the bypass passage and the side openings, means responsive to vehicle speed acting on the spool valve to urge the same in a direction opening the communication between the bypass passage and the side openings with increasing vehicle speed, and means for utilizing the pressure of said fluid itself to displace the spool valve in the direction of opening communication between the bypass passage and the side openings, the latter means comprising a shoulder portion on said spool valve and a chamber surrounding the shoulder portion and receiving the pressure fluid to urge the spool valve in the direction of opening of communication between the side openings and the bypass passage, said chamber surrounding the shoulder portion being disposed after the bypass passage whereby the pressure of the fluid on the aforesaid chamber diminishes with vehicle speed.

* * * * *